Figure 1:
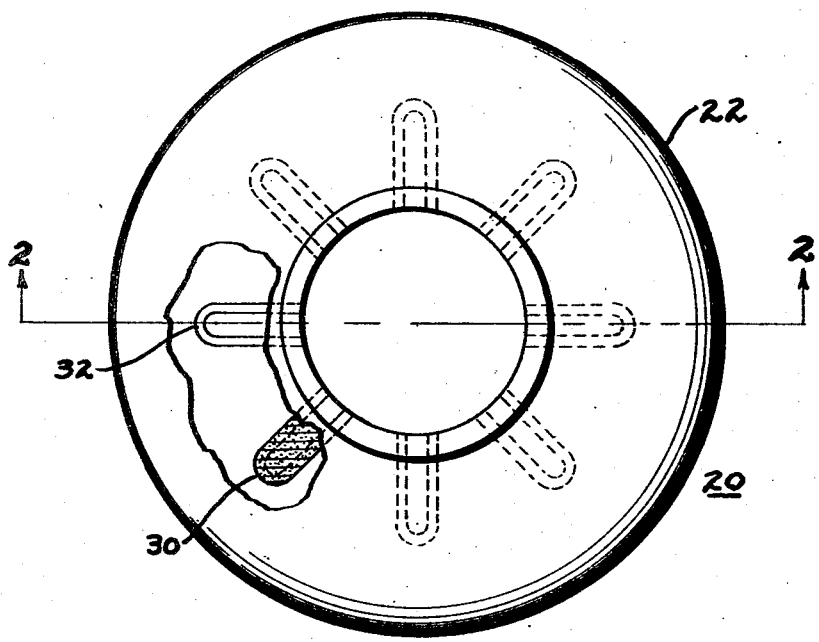

Nov. 4, 1947.  E. W. REINSCH ET AL  2,430,078
POROUS METALLIC FILTER ELEMENT
Filed Sept. 2, 1943

INVENTORS
EARL W. REINSCH, DONALD W. DEBRA
AND THEODORE N. KUNZOG
BY
ATTORNEYS

Patented Nov. 4, 1947

2,430,078

UNITED STATES PATENT OFFICE 2,430,078

POROUS METALLIC FILTER ELEMENT

Earl W. Reinsch, Donald W. De Bra, and Theodore W. Kunzog, Dayton, Ohio, assignors to General Motors Corporation, Detroit, Mich., a corporation of Delaware Application September 2, 1943, Serial No. 500,942

4 Claims. (Cl. 210—205)

This invention relates to filter elements and is particularly concerned with filter elements made from highly porous metal.

It is one of the objects of the invention to provide a highly porous metallic filter element of hollow form with a central aperture therethrough so that said element, or a plurality of said elements, may be placed over a perforated tube so that fluid filtered thereby passes through the element and drains from the center thereof into the tube.

A further object of the invention is to provide a supporting spider within the element to strengthen the same and prevent collapse.

A still further object of the invention is to form the element in two portions each comprising a dished-out annular porous metal body having the same number of integral ribs molded therein so that when the two portions are disposed face to face with the ribs equally spaced that the portions form a closed element having a supporting spider therein. In carrying out the above object, it is a further object to secure the two portions of the element at their circumferential edges adjacent their contacting faces by means of spraying metal therearound.

It is a still further object of the invention to provide a masking means through the use of sprayed metal whereby portions of the porous metal are made impervious to fluid flow.

Further objects and advantages of the present invention will be apparent from the following description, reference being had to the accompanying drawings wherein preferred embodiments of the present invention are clearly shown.

Figure 2:
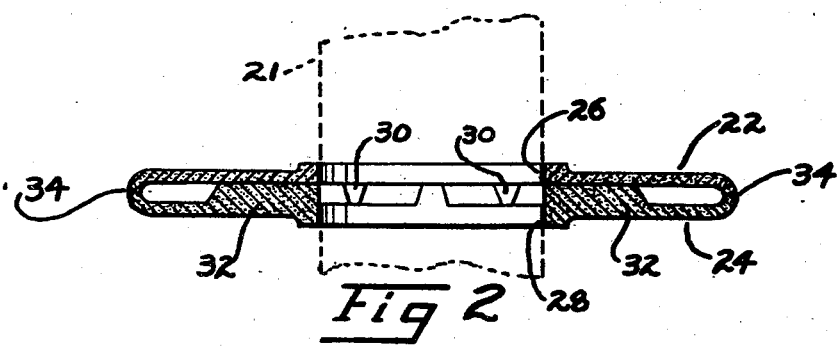

In the drawings:

Fig. 1 is a fragmentary plan view of one type of filter element showing the construction thereof and Fig. 2 is a view taken on line 2—2 of Fig. 1.

Fluid filters having high capacities are used in large numbers in connection with internal combustion engines and other mechanisms wherein oil or other fluid mediums is circuated and is necessarily cleaned before reuse thereof to prevent recirculation of minute particles of metal, dirt and other harmful suspended matter. It is a well known fact in the lubrication of moving parts, that the oil must be clean and free from foreign material to prevent scoring of the parts.

In the past, filters of this character have been utilized which employ screens, and the like, which filters are expensive to manufacture. Further, in forced lubricating systems, considerable pressure is utilized in the circulation of oil which necessitates a strong filter element. Filters made of gauze are, however, difficult to fabricate and are very expensive since an internal grid of some character must be employed to maintain spacing of the gauze and the outer edges of the gauze must be secured together to form a unitary structure. In cleaning filters of this character, by reverse flow therethrough, the filters are apt to explode or tear loose from the outer fastenings thereby making the entire filter element inoperative and requiring a replacement thereof.

Our invention is directed to an improved filter element 20 which may be used in connection with a perforated tube (shown in dotted lines at 21) wherein the filter comprises a hollow annular element. The element 20 is made up of two annular dish-shaped plates 22 and 24 which are apertured at 26 and 28 thereof respectively and which each include a plurality of integral ribs 30 and 32 respectively. These plates are assembled so that the dished-out portions thereof face one another and so that the circumferential edges are contiguous. The ribs 30 and 32 are spaced equally and are of such dimensions that the ribs 32 of the plate 24 abut the internal surface of the plate 22. When the two plates 22 and 24 of the filter element are thus assembled, they are secured together at their outer circumferential edges as at 34.

The plates or filter parts of this invention are formed from molded and sintered metal powders, preferably bronze or copper-nickel mixtures or in some cases, iron or iron and copper. In fact, the element can be made from any desired metal powder which can be molded and sintered to form a strong, highly porous mass.

In the manufacture of these plates, metal powders are placed in a non-adhering mold usually graphite having the desired contour and are then sintered under non-oxidizing conditions to form a highly porous sintered mass. Little or no compression is used on the metal powder, that is to say, that the powder if filled loosely into the mold prior to sintering and may be tamped lightly in place but no heavy pressure is used so that the powder before sintering must be held in place by the mold as it is not self-sustaining.

In Olt Patent 2,273,589, owned by the assignee of the present invention, various metal powders are disclosed, which powders have constituent rich surfaces. This type of powder is particularly desirable in the manufacture of elements of this character although the powders of the elemental metals may be mixed if desired. When a bronze filter element is desired either a mixture of copper and tin powders is utilized in the desired proportions or bronze powders having a tin rich surface as described in said Olt patent may be used. After the mold is filled, it is placed in a sintering furnace and sintered at a temperature in the neighborhood of 1550° F. for a period of from 20 minutes to an hour whereby homogeneity of the constituent metals is accomplished, that is, the copper and tin alloy to form a bronze which is substantially of uniform analysis throughout. When using a mixture of copper and nickel wherein the nickel is in quantities of 60% or more, a temperature of 2000° F. may be used and when using mixtures of copper and iron, wherein iron is in the proportion of 60% or more a temperature of 2000° F. is likewise desirable. In all cases, the higher melting point powder should be predominant and a sintering temperature should be chosen intermediate the melting points of the highest and lowest melting point metals in the mixture. Sintering and cooling of the metal should be carried out under non-oxidizing conditions. Obviously, any other metals may be used by following similar teachings as are well known in the art.

One of the features of the present invention is directed to the fastening or securing of the two filter plates 22 and 24 into an integral unit 20. This fastening may be carried out in a number of manners but we have found that the most successful procedure utilizes sprayed metal. In this instance, metal is sprayed, for example, bronze, by means of a metal spray gun, such as, a "Shoup gun," while the two plates are held in a fixture. The gun is directed at the circumferential edge of the assembly and builds up a layer of metal therearound, which not only positively secures or welds the two plates together but simultaneously masks out the edge of the assembly by making it impervious to fluid flow therethrough. Obviously, this method of masking may be utilized in other embodiments wherein portions of a porous metal member are desired to be impervious to fluid flow. The sprayed metal layer holds the two plates securely together since it is obvious that the porous metal, being highly porous, due to its method of manufacture, permits portions of the sprayed metal to enter into the pores thereof and interlock therewith. The metal particles during spraying are hot and therefore upon impingement against the porous metal conform to the internal shape of the pores as they are forced therein. Thus, this method of assembly provides a very strong bond between the two plates as well as destroying the porosity at the edge of the plates. In some cases, it may be desirable to form a chamfered edge on each plate so that when the plates are assembled, the two chamfered edges form a V-shaped groove. This structure in general will provide a stronger bond between the porous metal and the sprayed metal since more sprayed metal will be present. However, in many instances, a groove is unnecessary and this may be readily determined by trial in order to predetermine if the strength of the bond is sufficient.

While the embodiments of the present invention as herein disclosed, constitute preferred forms, it is to be understood that other forms might be adopted, all coming within the scope of the claims which follow.

What is claimed is as follows:

1. A filter element adapted to be placed over a perforate tube so that fluid filtered therethrough passes through the element and into the tube, comprising in combination; two identical annular plates each having a central aperture therethrough and made from sintered substantially non-compacted metal powder, each plate having a somewhat dished-out contour so that when the plates are positioned with their circumferential edges contiguous with one another that they form a hollow annular element, each plate having a plurality of supporting ribs extending radially from said central aperture and having a depth sufficient so as to support the other plate when the two plates are assembled.

2. A filter element adapted to be placed over a perforate tube so that fluid filtered therethrough passes through the element and into the tube, comprising in combination; two identical dished-shape porous metal plates made from sintered non-compacted metal powder, a plurality of radially extending integrally formed supporting ribs on each of said plates, said plates being adapted to be assembled face to face so as to form a hollow annular element with the supporting ribs in substantially equally spaced relation to one another whereby the ribs of one plate form a support at the internal face of the other plate, said plates being secured together around the circumferential edges thereof.

3. A filter element as claimed in claim 2 wherein the ribs terminate a spaced distance from the outer circumferential edge of the plates.

4. The article as claimed in claim 2 wherein the plates are secured around their circumferential edges by means of a sprayed metal layer.

EARL W. REINSCH.
DONALD W. DE BRA.
THEODORE W. KUNZOG.

REFERENCES CITED

The following references are of record in the file of this patent:

UNITED STATES PATENTS

| Number | Name | Date |
| --- | --- | --- |
| 1,223,777 | Eby | Apr. 24, 1917 |
| 1,412,656 | Jenkins | Apr. 11, 1922 |
| 1,817,888 | Lowe | Aug. 4, 1931 |
| 2,074,848 | Levy | Mar. 23, 1937 |
| 2,220,641 | Davis | Nov. 5, 1940 |
| 2,297,817 | Truxell Jr. et al. | Oct. 6, 1942 |
| 2,327,805 | Koehring | Aug. 24, 1943 |
| 2,267,918 | Hildabolt | Dec. 30, 1941 |
| 2,165,931 | Levy | July 11, 1939 |
| 2,304,618 | Williams | Dec. 8, 1942 |
| 2,306,823 | Meldrum | Dec. 29, 1942 |
| 622,562 | Sutton | Apr. 4, 1899 |
| 2,148,708 | Orr | Feb. 28, 1939 |
| 1,408,785 | Torley | Mar. 7, 1922 |
| 364,933 | Hyatt | June 14, 1887 |

FOREIGN PATENTS

| Number | Country | Date |
| --- | --- | --- |
| 13,154 | Great Britain | 1850 |